United States Patent [19]

Parker

[11] Patent Number: 5,193,435
[45] Date of Patent: Mar. 16, 1993

[54] PISTON WITH CERAMIC LOAD-TRANSMITTING PADS

[75] Inventor: David A. Parker, Rugby, United Kingdom

[73] Assignee: T&N Technology Limited, Warwickshire, United Kingdom

[21] Appl. No.: 918,792

[22] Filed: Jul. 27, 1992

Related U.S. Application Data

[63] Continuation of Ser. No. 713,308, Jun. 11, 1991, abandoned.

[30] Foreign Application Priority Data

Jun. 23, 1990 [GB] United Kingdom ............... 9014047
Jun. 23, 1990 [GB] United Kingdom ............... 9014049

[51] Int. Cl.$^5$ ............................................. F16J 9/00
[52] U.S. Cl. ........................................ 92/212; 92/222; 92/224; 123/193.6
[58] Field of Search ............... 92/212, 213, 222, 223, 92/224, 225, 231, 126; 123/193.6

[56] References Cited

U.S. PATENT DOCUMENTS

| | | | |
|---|---|---|---|
| 4,306,489 | 12/1981 | Driver et al. | 92/212 |
| 4,440,069 | 4/1984 | Holtzberg et al. | 92/224 |
| 4,466,399 | 8/1984 | Hinz et al. | 123/193 P |
| 4,548,125 | 10/1985 | Huther | 123/193 P |

FOREIGN PATENT DOCUMENTS

| | | | |
|---|---|---|---|
| 2633692 | 1/1990 | France | 123/193 P |
| 0247039 | 12/1985 | Japan | 123/193 P |
| 0119663 | 5/1990 | Japan | 123/193 P |

*Primary Examiner*—Thomas E. Denion
*Attorney, Agent, or Firm*—Nixon & Vanderhye

[57] ABSTRACT

A piston comprises a crown (12) and a skirt (20). At least a portion of the skirt (20) is formed of a ceramic material injection moulded directly on to the remainder of the skirt (20) or the crown (12). The ceramic material provides a plurality of pads (24) which projects from a thrust surface of the skirt (20) to transmit lateral forces against a wall of an associated cylinder.

10 Claims, 1 Drawing Sheet

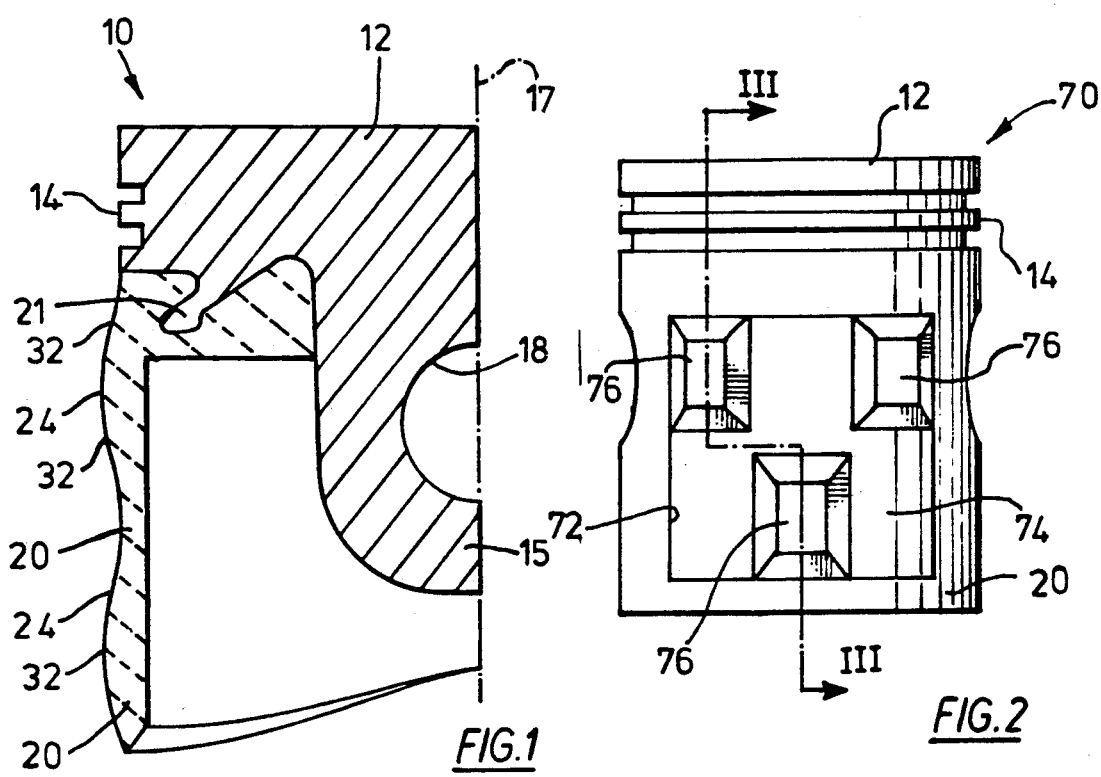
FIG.1
FIG.2
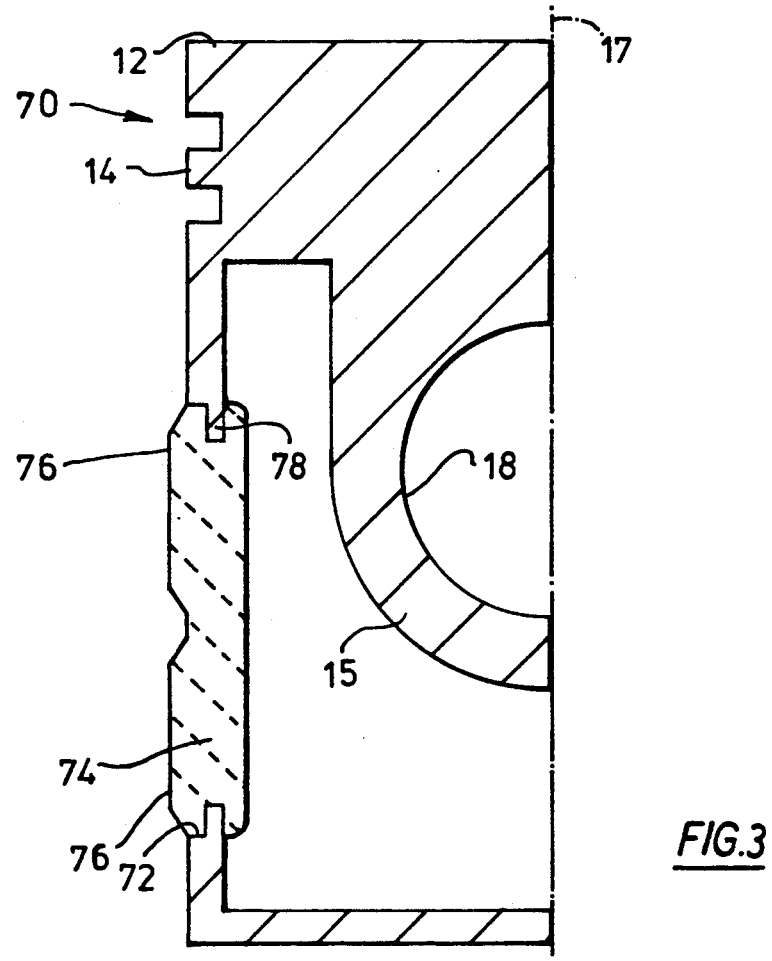
FIG.3

PISTON WITH CERAMIC LOAD-TRANSMITTING PADS

This is a continuation of application Ser. No. 07/713,308, filed Jun. 11, 1991 now abandoned.

BACKGROUND OF THE INVENTION

The present invention relates to pistons for engines or motors, for example, internal combustion engines, or hydraulic or pneumatic reciprocating motors. In particular, the invention relates to pistons comprising a crown and a skirt.

The present invention is concerned with the construction of the piston skirt, or to part of a skirt having at least one insert therein, the insert being of a different material from that of the remainder of the piston skirt.

It is known to reduce the weight of a piston by replacing a metal skirt with a skirt of a plastics material secured within the piston.

It is known to provide plastic inserts for several different purposes. Thus, for example, in UK patent specification No. 2,162,614 it is disclosed to provide on each of both thrust faces of a piston skirt a plurality of plastic inserts to transmit lateral thrusts of the piston against a cylinder wall. Further, in order to reduce wear of the plastic inserts it is disclosed that each plastic insert is bevelled appropriately to cause provided lubrication to be forced over the plastic inserts by a hydrodynamic action during the reciprocation of the piston.

Further, it is disclosed in UK patent specification No. 21,62,614 that the plastic inserts are secured within recesses formed in the outer surfaces of the skirts, for example, by the inserts each being held in the co-operating recess, possibly each recess being formed with undercut portions, and the insert being formed with tongues each of a shape to be held within the associated undercut portion.

It is an object of the present invention to provide a piston having a skirt of a novel and advantageous construction.

BRIEF SUMMARY OF THE INVENTION

The invention provides a piston for an engine or a motor comprising a piston body comprising a crown and a skirt, wherein at least a portion of the skirt is formed of a ceramic material injection moulded directly on to the piston body, said portion providing a plurality of pads which project from a thrust surface of the skirt to transmit lateral forces against the wall of an associated cylinder.

An advantageous ceramic material for a piston part has low friction surfaces, and provides a rigid part. Further, a ceramic piston part advantageously will not wear if an abrasive fuel is burnt in the engine.

The ceramic material may be moulded by employing conventional injection moulding techniques, the ceramic material including a suitable binder for the injection moulding process. Injection moulding is advantageous in that it enables the piston part to be fabricated with low tolerances and, therefore, less subsequent machining of the piston part is required. In addition, the piston parts so obtained, advantageously have few knit lines, or seams, and only have a small amount of flash inadvertently formed therewith.

A ceramic piston part also may be advantageous by reducing the weight of the piston by replacing an equivalent known piston part of greater weight than the provided ceramic piston part.

The skirt may be wholly of a suitable ceramic material secured within the piston in any convenient way, i.e. the ceramic portion forms all of the skirt.

Where the entire skirt of a piston in accordance with the invention is formed of the ceramic material injection moulded on to the crown, the crown may be provided with a protrusion around which the skirt is injection moulded so that the protrusion is embedded in the ceramic material and acts to secure the skirt to the crown. Alternatively, the skirt may be injection moulded so that ceramic material of the skirt enters a groove in the crown so that the skirt is secured to the crown.

The pads may have bevelled edges to cause lubricant to be forced over the pads during reciprocation of the piston.

The ceramic material may, alternatively, be injection moulded into a recess or alternatively into an aperture. In this case the skirt may be of plastics material secured to a metal crown.

BRIEF DESCRIPTION OF THE DRAWINGS

The present invention will now be described by way of example with reference to the accompanying drawings in which:

FIG. 1 is a half section of one embodiment of a piston for an internal combustion engine, and in accordance with the present invention, the piston having a metal crown and a skirt wholly of a ceramic material;

FIG. 2 is side elevational view of a second embodiment of a piston according to the invention; and FIG. 3 is a half-sectional view taken on the line III—III in FIG. 2.

The piston 10 shown in FIG. 1 has a metal crown 12 of a conventional construction. The metal of the crown is an alloy of aluminium. Included in the crown 12 is a ring belt 14, and a boss 15 for the gudgeon pin (not shown). The gudgeon pin hole is indicated at 18 and the piston axis is indicated by the dotted line 17. Depending from the crown 12, and secured thereto is a skirt 20. The skirt 20 is wholly formed of a suitable ceramic material.

In a method of fabricating such a piston having a composite construction, the ceramic skirt 20 is formed on the crown 12 by employing a conventional injection moulding process. The ceramic material in powder form is dispersed in a suitable binder, and is injection moulded into a mould in which the crown 12 has been positioned. The ceramic material is, thus, directly moulded on to the crown.

In order to facilitate the securing of the skirt 20 to the crown 12, the crown is formed with an annular bulbous protrusion 21. The skirt 20 is injection moulded around the protrusion 21 so that the protrusion 21 is embedded in the ceramic material and acts to secure the skirt 20 to the crown 12. The binder is removed by use of solvent or by heat treatment or both, and the ceramic material is then sintered in a furnace. In this manner, the metal crown 12 can be secured to the ceramic skirt 20 in a satisfactory manner.

The ceramic material of the skirt 20 provides a plurality of pads 24 which project from a thrust surface of the skirt 20 to transmit lateral forces against a wall of an associated cylinder (not shown). The pads 24 have bevelled edges 32 to cause lubricant to be forced over the pad during reciprocation of the piston in similar manner to that described in GB patent specification No. 2,104,188. The appearance of the pads 24 of the piston 10 is similar to the pads 24 shown in FIG. 2. The skirt 20 surrounds the boss 15 and is spaced therefrom.

FIGS. 2 and 3 show a second piston 70 which is illustrative of the invention. The piston 70 has a metal crown 12 with an integral metal skirt portion 20. The skirt portion 20 has large apertures 72 in its thrust faces into which inserts 74 of ceramic material are injection moulded. The inserts 74 include three pads 76 similar to the pads 24 of the piston 10. The recess 72 has an inner shoulder 78.

Thus, the whole of a piston skirt, or the remainder of a skirt having a least one insert within a skirt of any suitable material other than a ceramic material, may be of any suitable ceramic material, for example being of silicon nitride, or silicon carbide, which can be injection moulded by employing a suitable binder.

I claim:

1. A piston for an engine or a motor comprising a piston body comprising a crown and a skirt, wherein all of the skirt is formed of a ceramic material injection molded directly onto the crown, the skirt providing a plurality of pads which project from each of two thrust surfaces of the skirt to transmit lateral forces against a wall of an associated cylinder.

2. A piston according to claim 1, wherein the skirt is injection molded around a protrusion from the crown so that the protrusion is embedded in the ceramic material and acts to secure the skirt to the crown.

3. A piston according to claim 1, wherein the pads have bevelled edges to cause lubricant to be forced over the pads during reciprocation of the piston.

4. A piston for an engine or a motor comprising a piston body comprising a crown and a skirt, wherein portions of the skirt form thrust surfaces which are provided with a plurality of pads projecting therefrom to transmit lateral forces against a wall of an associated cylinder, said pads formed as inserts of a ceramic material, injection molded directly onto the piston body into apertures extending through the skirt.

5. A piston according to claim 4 wherein the inserts are injection molded around protrusions formed at edges of the apertures to secure the ceramic material in the apertures.

6. A piston according to claim 4, wherein the pads have bevelled edges to cause lubricant to be forced over the pads during reciprocation of the piston.

7. A piston for an engine or a motor comprising a piston body comprising a crown and a skirt, the skirt having thrust surfaces from each of which a plurality of pads project to transmit lateral forces against a wall of an associated cylinder, the piston body being formed partly from metal and partly from ceramic material, the metal forming at least the crown and the ceramic material forming at least the thrust surfaces of the skirt from which the pads project, the ceramic material being directly injection molded onto the metal and being molded around a protrusion of the metal so that the protrusion is embedded in the ceramic material and acts to secure the ceramic material to the metal.

8. A piston according to claim 7, wherein all of the skirt is formed from ceramic material.

9. A piston according to claim 7, wherein the ceramic material is formed as inserts injection molded directly into apertures extending through the skirt, the protrusions being formed at the edge of the apertures.

10. A piston according to claim 7, wherein the pads have bevelled edges to cause lubricant to be forced over the pads during reciprocation of the piston.

* * * * *